United States Patent [19]
Erkfritz

[11] 3,762,005
[45] Oct. 2, 1973

[54] INDEXABLE CUTTING INSERT
[75] Inventor: Donald S. Erkfritz, Rockford, Ill.
[73] Assignee: The Ingersoll Milling Machine Company, Rockford, Ill.
[22] Filed: July 19, 1971
[21] Appl. No.: 163,952

Related U.S. Application Data
[63] Continuation-in-part of Ser. No. 67,949, Aug. 28, 1970, Pat. No. 3,694,876.

[52] U.S. Cl. .............................. 29/95 R, 29/105 A
[51] Int. Cl. ........................... B26d 1/00, B26d 1/12
[58] Field of Search ..................... 29/105 R, 105 A, 29/95, 96

[56] References Cited
UNITED STATES PATENTS
3,490,117   1/1970   Hertel .............................. 29/105 R
3,434,190   3/1969   Kaiser .............................. 29/105 R
3,464,098   9/1969   Moore et al. ..................... 29/105 R
3,188,717   6/1965   Heinlein ............................... 29/96

Primary Examiner—Harrison L. Hinson
Attorney—Wolfe, Hubbard, Leydig, Voit & Osann, Ltd.

[57] ABSTRACT

An indexable cutting insert with a central screw-receiving hole is formed with four convexly curved cutting faces defined by the bottoms of grooves extending along the narrower edge surfaces of the insert and on opposite sides of flat intervening lands for locating the insert in a precise position relative to a cutter body. As a result of the location and profile of the cutting faces, the insert possesses high compressive strength and is capable of making fine finishing cuts.

3 Claims, 10 Drawing Figures

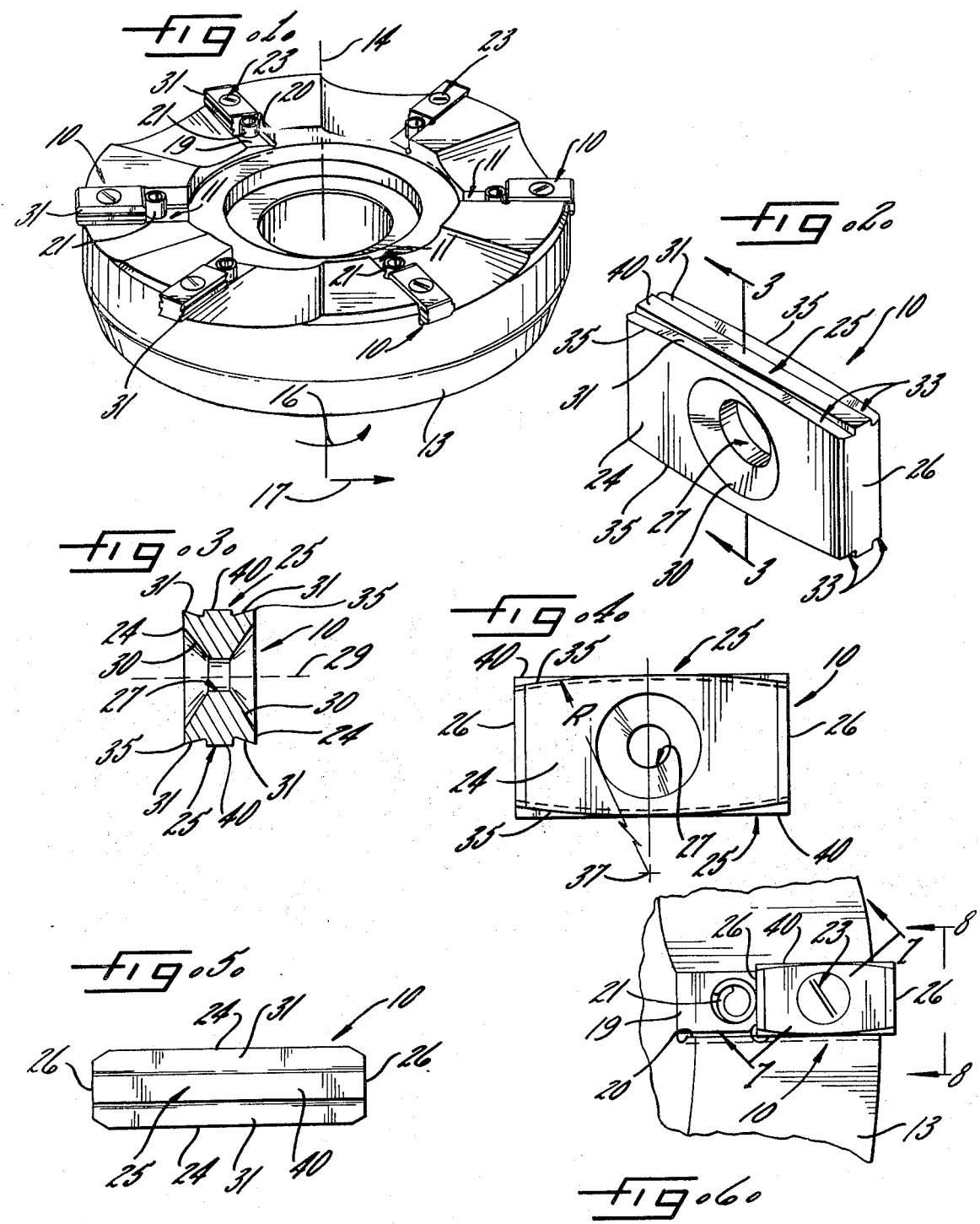

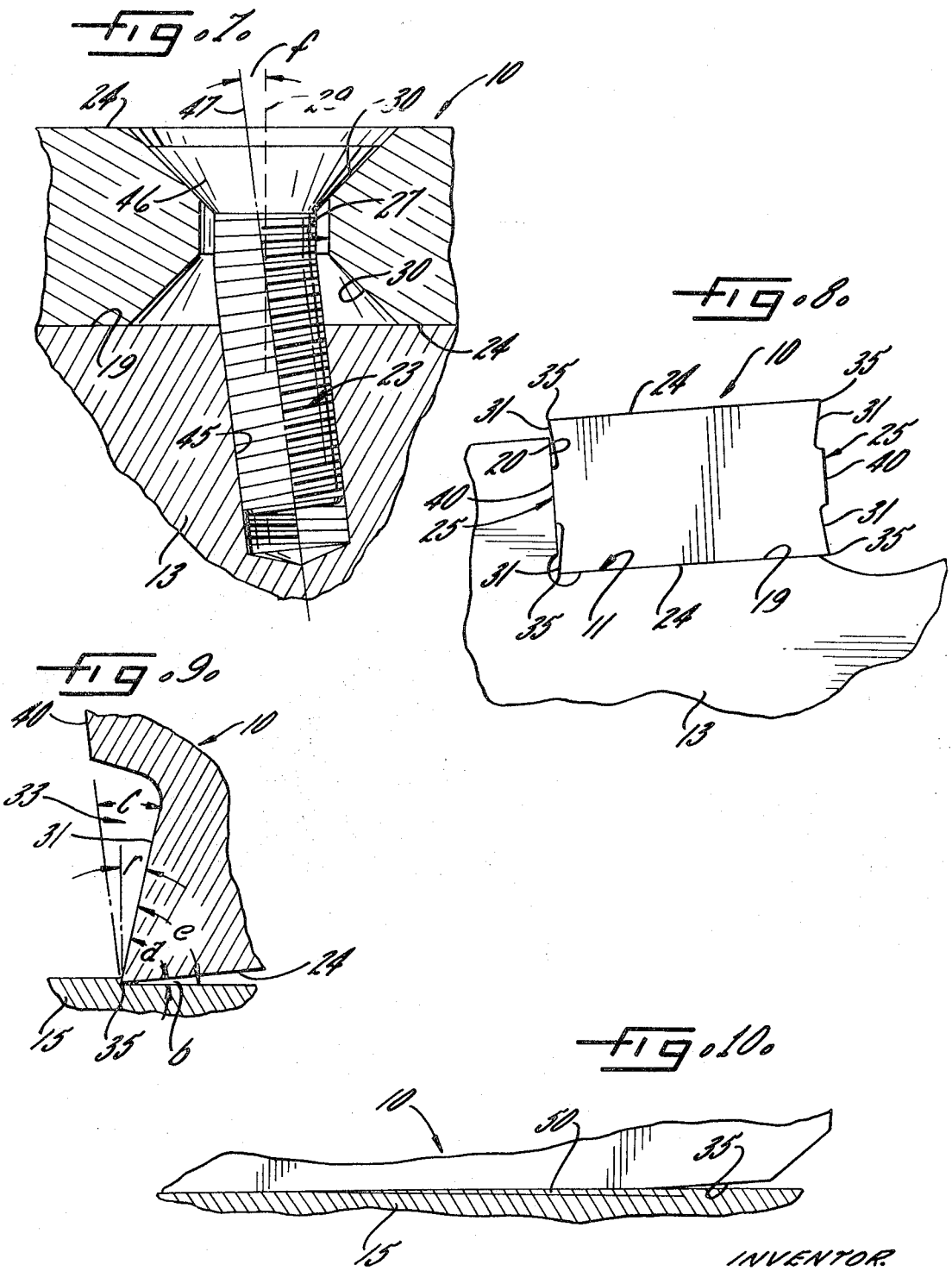

INDEXABLE CUTTING INSERT

CROSS-REFERENCE TO RELATED APPLICATION

This application is a continuation-in-part of my copending United States application Ser. No. 67,949, filed Aug. 28, 1970 now U.S. Pat. No. 3,694,876.

BACKGROUND OF THE INVENTION

This invention relates to an indexable cutting blade or insert adapted to be clamped to and located edgewise on a supporting platform in the same general manner as disclosed in the aforementioned patent. More specifically, the invention relates to a cutting insert of the general type disclosed in Kaiser U.S. Pat. No. 3,434,190 in which the cutting faces of the insert are formed by grooving the insert in a particular fashion to enable each cutting edge to act on a workpiece with positive rake across the cutting face and with conventional clearance across the adjacent clearance face. In addition, each cutting face is convexly curved so that the cutting edge may make fine finishing cuts even though the rotational axis of the cutter is tilted slightly relative to the plane of the workpiece.

SUMMARY OF THE INVENTION

The present invention provides an indexable finishing insert of the above character in which the convex cutting faces are uniquely located and formed by grooving the narrower edge surfaces of a polygonal block of cutting material so that each cutting face will possess high compressive strength as a result of being backed by a comparatively wide mass of material located between the edge surfaces.

A further object of the invention is to clamp the insert on and to crowd the insert against the platform with a standard screw which is received by the insert through a centrally located hole about which the convex cutting faces are symmetrically curved.

The invention also resides in the novel location of the grooves on the edge surfaces to leave each edge surface with a flat and planar land for locating the insert edgewise in a precise position on the supporting platform.

These and other objects and advantages of the invention will become more apparent from the following detailed description when taken in conjunction with the accompanying drawings.

BRIEF DESCRIPTION OF THE DRAWINGS

FIG. 1 is a perspective view of an exemplary cutter equipped with new and improved inserts embodying the novel features of the present invention.

FIG. 2 is a perspective view of one of the inserts.

FIG. 3 is a cross-section taken along the line 3—3 of FIG. 2.

FIG. 4 is a face view of the insert shown in FIG. 2.

FIG. 5 is an edge view of the insert shown in FIG. 2.

FIG. 6 is a fragmentary plan view of the cutter shown in FIG. 1.

FIG. 7 is an enlarged fragmentary cross-section taken substantially along the line 7—7 of FIG. 6.

FIG. 8 is an enlarged elevational view taken along the line 8—8 of FIG. 6.

FIGS. 9 and 10 are enlarged fragmentary sectional views of the insert and workpiece and illustrating the cutting action.

DETAILED DESCRIPTION OF THE PREFERRED EMBODIMENT

While the indexable inserts 10 constituting the present invention may be used in a wide variety of cutters to provide a number of available cutting edges without resharpening, the inserts are shown in the drawings secured in pockets 11 spaced angularly around the body 13 of a finish milling cutter. The cutter is adapted to be secured to a spindle for rotation about a central axis 14 and is adapted to remove extremely thin layers of metal from a workpiece 15 (FIG. 10) when rotated and fed edgewise relative to the workpiece as indicated by the arrows 16 and 17 in FIG. 1. Normally, the cutter axis 14 is tilted just slightly relative to the plane of the workpiece rather than being perpendicular to such plane so that the inserts will clear the already finished workpiece surface when the inserts are rotated past the cut and around to the trailing side of the body opposite the cut.

In this instance, the pockets 11 are formed by milling angularly spaced slots in the body 13 and then by precisely grinding the bottom and one side of each slot to form a flat platform 19 (FIG. 8) and an accurately machined upstanding abutment wall 20 for supporting and locating the insert 10. An additional abutment in the form of a roll pin 21 (FIGS. 1 and 6) is pressed into a hole in the inner end portion of the platform and locates the insert radially of the body 13 with the outer end portion of the insert overhanging the peripheral edge of the body.

The present invention contemplates the provision of a unique indexable insert 10 which is capable of making smooth scallop-like finishing cuts in spite of the tilt of the cutter axis 14 and which, at the same time, possesses higher compressive strength than comparable inserts available heretofore. Moreover, the insert is advantageously clamped to the platform 19 through the use of a standard screw 23 and is formed in such a manner as to insure precise location of the insert against the abutment wall 20.

More particularly, the preferred insert 10 is a flat and generally rectangular block of cutting material such as tungsten carbide and is initially formed with a pair of flat and parallel side surfaces 24 (FIGS. 2 to 5) and with a pair of flat and parallel edge surfaces 25 extending perpendicular to the side surfaces. The side surfaces 24 are wider than the edge surfaces 25 and, in the illustrated insert, the side surfaces have a width of approximately nine-sixteenths inch while the edge surfaces have a width of approximately three-eighths inch. The insert also includes a pair of flat and parallel end surfaces 26 extending perpendicular both to the side surfaces and to the edge surfaces. Extending through the insert between the side surfaces 24 is a centrally located screw-receiving hole 27 (FIG. 3) whose axis 29 extends perpendicular to the side surfaces and parallel to the plane of each edge surface 25. Both ends of the hole are recessed and formed with frusto-conical seats 30 whose axes coincide with the axis 29 of the hole.

In carrying out the invention, the narrower edge surfaces 25 of the insert 10 are grooved longitudinally to form cutting faces 31 (FIGS. 1, 2 and 5) each disposed relative to its coacting clearance face (defined by the adjacent wider side surface 24) at an included angle $a$ (FIG. 9) substantially less than a right angle so that when the insert is mounted on the cutter body 13 to provide the desired cutting clearance $b$ across the side surface 24, the cutting face will be positioned to act on the work with a positive axial rake $r$. In addition, each cutting face 31 is curved convexly along its length to enable the insert to perform fine finishing operations and to take wide scallop-like cuts to produce a smooth, flat finish.

Herein, each cutting face 31 is defined by the bottom of a narrow groove 33 (see FIGS. 2 and 9) cut along one edge portion of each edge surface 25 and extending along the entire length thereof, there being a total of four grooves in all with each groove extending along one edge portion of each edge surface. Each groove opens outwardly and its bottom (i.e., the cutting face 31) slopes inwardly and away from the plane of the adjacent edge surface 25 at an angle $c$ (FIG. 9) which is equal to the sum of the desired values of the clearance angle $b$ and the positive rake angle $r$. At the intersection of each cutting face 31 with the adjacent side surface 24 is defined a main cutting edge 35 which extends along the length of the insert 10. The ends of each cutting edge are beveled inwardly as shown in FIG. 5 by Forming chamfers 36 at the junctions of the side surfaces 24 with the end surfaces 26.

To adapt the insert 10 for fine finishing operations, each of the cutting faces 31 is curved convexly and arcuately on a large radius R (for example, 12 inches) and about a centerline 37 (see FIG. 4) which is located in a plane containing the axis 29 of the hole 27 and extending perpendicular to the side surfaces 24 and the edge surfaces 25. Each cutting face is curved symmetrically relative to the hole 27, and the lengthwise midpoint of the cutting edge is tangent to the plane of the adjacent edge surface 25. The curvature may be imparted to the cutting face 31 and the cutting edge 35 by swinging the insert arcuately about the centerline 37 during grinding of the groove 33.

Advantageously, each groove 33 terminates short of the midportion of the associated edge surface 25 so as to leave an intervening flat and planar land 40 extending along such midportion and between each pair of grooves cut In the same edge surface. The extreme edges of each land parallel one another and the side surfaces 24, and the lands are slightly radiused as shown in FIG. 9. Being flat and planar, the lands engage the abutment walls 20 face-to-face when the inserts 10 are secured to the body 13 and thus serve to locate the inserts in a precise position relative to the body.

Clamping of the insert 10 to the platform 19 and edgewise crowding of the insert against the abutment wall 20 and the roll pin 21 are effected through the use of the screw 23 which threads into an upright hole 45 (FIG. 7) in the center of the platform. The screw is formed with a frusto-conical head 46 adapted to seat fully as shown in FIG. 7 in one of the complemental seats 30 formed at the ends of the center hole 27 in the insert. The screw is tightened by a tool inserted into a socket in the flat end of the head which is disposed somewhat below the surrounding side surface 24 of the insert when the head is fully seated as shown in FIG. 7.

The outer end of the axis 47 of the screw hole 45 in the cutter body 13 is tilted at an angle $f$ (FIG. 7) of a few degrees toward a corner defined by the intersection of the plane of the abutment wall 20 and a perpendicular plane containing the centerline of the roll pin 21. The axis 47 is, however, offset laterally a few degrees from this corner and toward the abutment wall 20 rather than lying in a plane which bisects the corner. Thus, as the screw 23 is tightened to draw the head 46 into the outer seat (whose axis is perpendicular to the platform 19), the conical surface of the head cams the insert 10 edgewise and generally diagonally toward the corner with the land 40 first engaging and being pressed tightly against the abutment wall 20 and with the inner end surface 26 then engaging and being pressed against the roll pin 21. To allow full seating and clamping of the screw head, the shank of the screw is weak enough to bend and, as a result of the inclination of the hole 45, does in fact bend as shown in FIG. 7 during final tightening of the screw as the land 40 and the end surface 26 engage the abutment wall 20 and the roll pin 21, respectively.

Accordingly, the screw 23 serves to clamp the insert 10 tightly against the platform 19 and to force the insert edgewise against the abutment wall 20 and the roll pin 21. Because the flat and planar land 40 is left on the edge surface 25 between the grooves 33, the insert is located in a precise position against the abutment wall so as to position the opposite, active cutting edge 35 in an accurate cutting position.

To renew the active cutting edge 35 after the latter has become worn, the screw 23 is removed and the insert 10 is turned one-half revolution thereby to locate the cutting edge on the opposite edge surface 25 in an active cutting position. When this cutting edge becomes worn, the screw is removed and the insert is inverted and replaced on the platform so that one of the cutting edges extending along the opposite side surface 24 projects beyond the body 13 in active cutting position. The fourth cutting edge is brought into active position simply by turning the inverted insert end-for-end. After each re-positioning of the insert, the screw 23 is tightened down to force the insert edgewise against the abutment wall 20 and the roll pin 21 which coacts with the lands 40 and the end surfaces 26 to locate the insert and its active cutting edge in precisely the same position in each of the four positions in which the insert may be indexed. In addition to presenting four available cutting edges 35 for use in the cutter illustrated, each insert also may be used in conjunction with a cutter of opposite hand as a result of the cutting edges extending along the entire length of the insert. Also, the cutting faces 31 may be re-ground after wear and the insert may be re-used, the lands 40 (which are not ground) serving to locate the re-ground inserts properly on the cutter body.

The platforms 19 are inclined relative to the plane and direction of rotation of the body 13 (see FIG. 8) to locate the clearance face (defined by the side surface 24) of the active cutting edge 35 at the desired clearance angle $b$ (FIG. 9) relative to the plane of the workpiece. The angle $c$ of the cutting face 31 is greater than the clearance angle $b$ and, as a result, the cutting face acts on the workpiece 15 with an effective positive rake axial angle $r$ and is disposed at an acute included angle $e$ relative to the work surface when the insert is positioned on the platform. By changing the angle $c$ and the inclination of the platform, any desired combination of rake and clearance angles may be achieved for the cutting edge 35.

As a result of the inclination of the platform 19 and the tilt of the cutter axis 14, each convex cutting edge 35 appears to the workpiece 15 as part of the long side of a shallow ellipse (see FIG. 10) whose end gradually diverges away from the workpiece. Accordingly, the cutting edge removes an extremely thin chip 50 which gradually tapers along the edge to approximately the midpoint of the edge to form wide gradually feathered scallops in the workpiece and thus leave the latter with an extremely flat and accurate surface in spite of the slight tilt of the cutter axis 14.

With the cutting faces 31 formed on the narrower edge surfaces 25 of the inserts 10, each cutting face is backed by the comparatively wide mass of cutting material located between the edge surfaces and approximately equal in width to the width of the side surfaces 24. As a result of such backing, the cutting face possesses high compressive strength and may be fed across the workpiece at rapid rates.

I claim as my invention:

1. An indexable cutting insert comprising a generally rectangular block of cutting material having a pair of flat, parallel and comparatively wide side surfaces, a hole extending through said block from one side surface to the other side surface and adapted to receive a fastener for crowding the block edgewise against an abutment projecting from the plane of a flat platform of a cutter body, said block also having a pair of narrower edge surfaces located at opposite edges of said side surfaces and extending transversely of the side surfaces, narrow grooves undercut along the length of each opposite edge portion of each said edge surface and terminating short of the midportion of such edge surface to leave an intervening flat and planar land extending along said midportion for locating the block in a precise position when the block is crowded edgewise , all four of said grooves extending parallel to one another to leave said lands with edges extending parallel to one another and to said side surfaces, the bottom of each of said grooves constituting the cutting face of a cutting edge defined by the intersection of such face and a clearance face formed by the adjacent side surface of the block, each cutting face sloping inwardly and away from said cutting edge to provide between the clearance and cutting faces of each cutting edge an included angle which is less than a right angle thus permitting each cutting edge to act on a workpiece with conventional clearance across the clearance face and with positive axial rake across the cutting face, and each cutting face curving arcuately and convexly along its length on a radius several times the width between said edge surfaces.

2. An indexable cutting insert as defined in claim 1 in which said hole is centrally located in said block, each of said cutting faces being curved arcuately about a centerline which lies in a plane extending perpendicular to said side surfaces and said edge surfaces and containing the axis of said hole 3. An indexable cutting insert as defined in claim 2 in which each of said cutting faces is curved symmetrically relative to the axis of said hole.

* * * * *